Oct. 3, 1967     R. F. SHANNON     3,345,241
STRUCTURAL PANEL AND METHOD FOR PRODUCING SAME
Filed Dec. 13, 1965     2 Sheets-Sheet 1
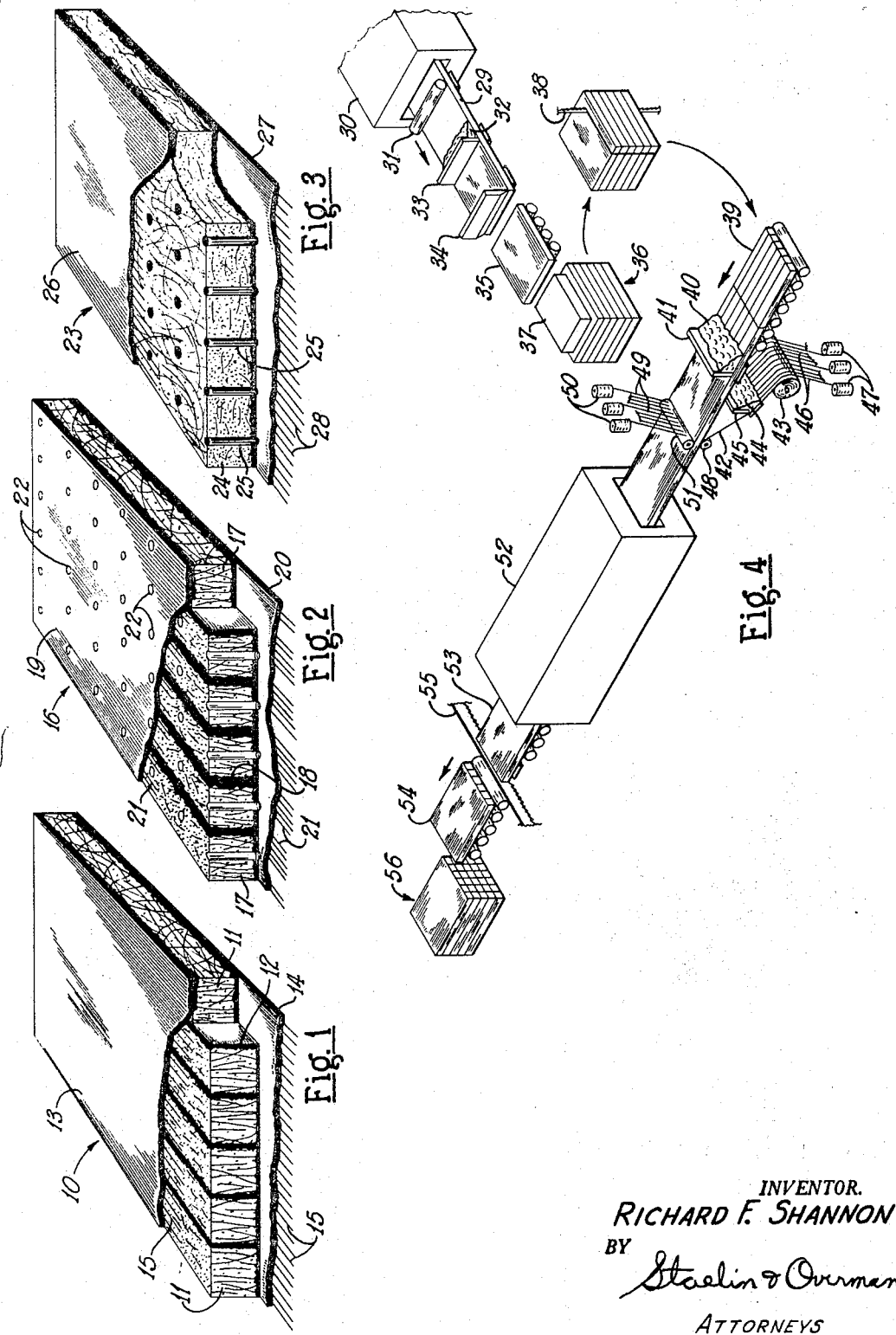
INVENTOR.
RICHARD F. SHANNON
BY
Staelin & Overman
ATTORNEYS INVENTOR.
RICHARD F. SHANNON
BY Staelin & Overman
ATTORNEYS

United States Patent Office 3,345,241
Patented Oct. 3, 1967

3,345,241
STRUCTURAL PANEL AND METHOD FOR PRODUCING SAME
Richard F. Shannon, Lancaster, Ohio, assignor to Owens-Corning Fiberglas Corporation, a corporation of Delaware
Filed Dec. 13, 1965, Ser. No. 513,401
8 Claims. (Cl. 161—36)

The present application is a continuation-in-part of my co-pending application Ser. No. 79,201, filed Dec. 29, 1960, now Patent Number 3,230,995.

This invention relates to an improved structural panel for a slab type roof deck or the like, and more particularly to an improved method for producing a lightweight insulating panel containing generally parallel siliceous fibers bonded together with organic resins or inorganic cements.

Panels of this type have been produced by individually coating the surfaces of fiberboards with inorganic cements. These coatings have either been surface coatings or have been homogenous layers which lay between and bond two layers of fiberboards together.

The method of the present invention represents an improvement over prior processes for producing structural I-beam insulation in the method of combining the cement with the glass fibers and the amounts of cement used. More particularly, instead of separating the strips in the core with thick layers of cement, the process of the present invention applies excess cement which is forced below the surfaces of the strips to provide a high strength region of combined cement and glass fiber core material adjacent each surface. Thus substantially all of the cement present is combined and reinforced with glass fibers, and maximum strengths are achieved with a minimum quantity of cement.

In the method of the present invention the cements or binders are forced laterally or sideways across generally parallel fibers to cause the binder to be extruded between successive layers of the fibers to produce tiny voids on the down-stream side of each fiber. The binder structure which is produced is, therefore, porous and of a honeycomb nature to provide a high strength region of binder and fiber that is stronger than an equivalent amount of the binder when it is not "squirted" past the fibers but lays in a monolithic layer on the surface of the fiberboard. The reason for this added strength is due to the fact that the "sieve action" achieved when the binder is "squirted" past the fibers decreases the density of the binder and correspondingly increases its depth of penetration of the fibers of the board. Inasmuch as some strength is derived from the fibers themselves, it has been found that they do not need to be totally enclosed by the binder, and that in the honeycomb structure produces a lateral stiffening sufficient to prevent bending of the individual fibers so that the fibers carry more stress. Since the density of the binder is decreased by the sieve action, the volume of fibers which are reinforced is proportionately greater, and therefore, the strength of the structure so produced is greater than is produced by a monolithic layer of the same binder material on the surface of the fiberboard. Because the binder is changed into a honeycomb structure, it is more fire-resistant and has more strength under wet conditions. It will be seen that the air space provided by the honeycomb material aids in resisting heat transfer. Since the binder extends in layers between the generally parallel fibers, it is more difficult for the water to penetrate through the binder. In addition, waterproofing agents which migrate to the surface of the binder have a greater waterproofing effect in the honeycomb structure since the binder lays in relatively thin layers, the center of which is made more waterproof by the proximity of the waterproofing at its surfaces.

It is, therefore, an object of the invention to provide a stronger structural panel which is produced at a lower cost.

A further object of the invention is to provide an improved structural panel having a high strength region of combined cement and glass fiber core material adjacent each surface and giving a maximum strength with a minimum of cement.

A still further object of the invention is to provide an improved method for producing structural panels which involves the handling of only large core sections.

A still further object of the invention is to provide a structural panel having improved weathering, insulating and fire-resistant characteristics, and which retains its strength under wet conditions.

Further objects and advantages of the invention will be apparent from the following specification and drawings in which like numbers are used throughout to identify like parts.

FIG. 1 is a perspective view, partially broken away, showing the preferred form of a structural panel made in accordance with the invention, which form is referred to as an I-beam construction;

FIG. 2 is a perspective view, partially broken away, showing an alternate embodiment of a structural product made in accordance with the invention, which embodiment hereinafter will be referred to as an acoustical I-beam construction;

FIG. 3 is a perspective view, partially broken away, showing still another embodiment of a structural panel which hereinafter will be referred to as a column type construction;

FIG. 4 is a schematic view of the apparatus used in carrying out the method of the invention;

Figure 5:
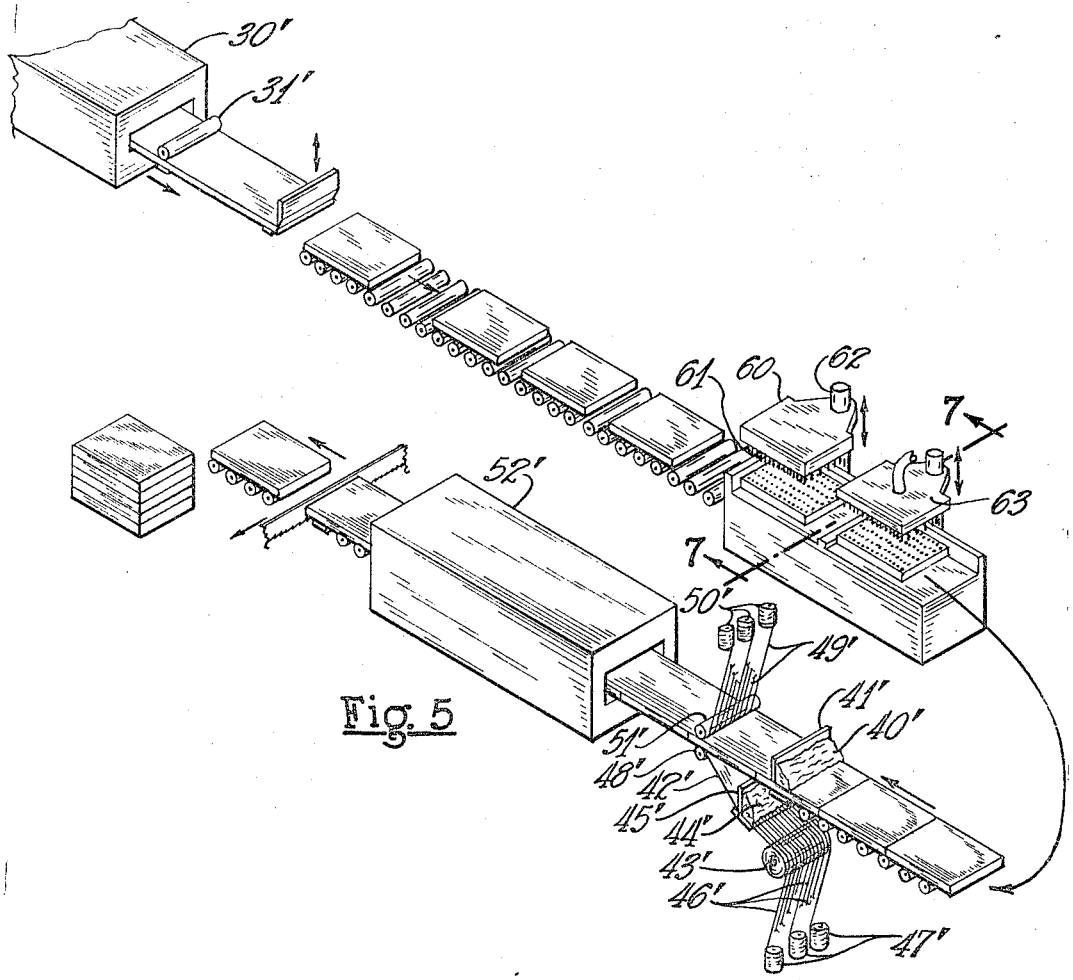
FIG. 5 is an isometric view of apparatus which can be used to make the structure shown in FIG. 3.

Referring now to FIG. 1, there is shown a structural panel 10 of the type that is herein referred to as an I-beam construction. The panel 10 comprises a plurality of porous core strips 11 that are in contact with one another and are held together with a hardened bonding material that is combined and reinforced with the material of the core strips to form areas of reinforcement or I-beams 12. The resulting core is capped by a top supporting skin 13 and a bottom supporting skin 14 each of which includes cement that is forced into the adjacent portions of the fibrous core to provide high strength regions of combined bonding material and fibers. A prime requisite of the strips 11 is that the surfaces which extend between the skins 13 and 14 not only be substantially smooth but also be generally parallel to insure uniform contact between the surfaces of adjacent strips.

The porous core strips 11 may be made from preformed glass fiberboards in a manner which will be described later in detail. The strips 11 can be made from rockwool or glass fibers which do not slump below 1850° F., in which case the panels 10 will withstand elevated temperatures without collapsing as well as be light in weight, and are then suitable for use in fireproof installations. The rockwool or glass fibers are preferably bonded with an inorganic binder to form dimensionally stable fiberboards.

The strips 11 may also be made from indurated calcium silicates where it is desired that the cores of the panels be incombustible. Such a material is "Kaylo," a product of Owens-Corning Fiberglas Corporation. Low density is achieved in this material by using a large percentage of vermiculite, pearlite or other lightweight inorganic filler, or by frothing or foaming hydrous calcium silicate to a light density. Glass foam may also be used where the panel 10 is to be fireproof.

The strips 11 are light in weight, having an apparent density which is preferably from 9 to 12 pounds per cubic foot, particularly when the panel 10 is to span long distances without support. Very good results are obtained when the strips 11 have a density of 11 pounds per cubic foot, and satisfactory panels have been produced from fibrous glass strips having a density as low as 4½ pounds per cubic foot.

In order to attain a high compressive strength in the panel 10, the strips 11 are so arranged that a high percentage of the fibers are generally parallel to the surfaces to be coated. The fibers may extend lengthwise of the strips 11 for some applications or may extend between the skins 13 and 14 as seen in FIGS. 1 and 2 for other applications. The contacting surfaces of the strips 11 are flat and parallel, and the thickness of each individual strip between these parallel surfaces is preferably in the range from ⅞ inch to 1 inch.

As shown in FIG. 1, the combined cement and glass fibers at the contacting surfaces of the strips 11 forms I-beams 12 which gives the panel construction its name. It will be appreciated that, when thinner core strips 11 are used, correspondingly more I-beams 12 per linear foot are present in the panel 10. The cement is forced below the surface of each of the strips 11 sideways past the fibers of the fibrous core to provide high strength regions of combined cement and glass fibers adjacent each surface where stress and buckling is likely to occur. This produces a maximum strength with a minimum quantity of cement.

The bonding material in the I-beams 12 may be an organic resin or an inorganic cement. More particularly, this bonding material may be a foamable novolac resin, a polyurethane foam, a polyester foam, or another similar foam or resin.

Also, inorganic cements have been satisfactory for use as the bonding material in the I-beams 12. For example, neutral, high strength alpha gypsums produce a very strong panel 10. A neutral gypsum [1] preferably has a compressive strength of at least 3500 p.s.i., a hardness of at least 80, and a maximum setting expansion of .003 inch per inch of product.

When strips 11 of "Kaylo" are used in the core of the panel 10, the surfaces of the strips must be treated. Otherwise, the affinity of such strips for water would result in water being removed from the gypsum before this cement has had sufficient time to set. Were this to happen, the hydration of the gysum would not proceed in the normal manner, and the cement would not attain full strength.

This problem is solved by applying a substantially impervious, gypsum-compatible layer to the strips 11 before the gypsum is applied. Satisfactory results have been achieved by applying a 7 percent starch solution to the "Kaylo" to enable the gypsum to cure in the normal manner. Another material which is suitable for this layer is carboxy methyl cellulose with a viscosity of about 15 centipoises. Also, a water solution of bone glue is suitable for this layer. All of the above named materials are applied to the strips 11 as colloidal suspensions.

Calcined gypsum, which is obtained by heating raw gypsum to drive off most of the water of crystallization and form a gypsum hemihydrate, $CaSO_4 \cdot \frac{1}{2}H_2O$, is a satisfactory cement. This gypsum hemihydrate can combine readily with water, and the mechanism of setting is such that 18.6 pounds of water are required to convert 100 pounds of gypsum hemihydrate to the insoluble dihydrate, $CaSO_4 \cdot 2H_2O$.

An important factor in mixing the gypsum slurry for the I-beams 12 is the use of "normal consistency" ratios. "Normal consistency" is defined as the number of parts of water, by weight, at a definite temperature, that is required to produce the slurry fluidity when mixed with 100 parts of calcined gypsum, by weight, in a specified manner. It is possible to vary the compressive strength of alpha gypsum from 1000 p.s.i. to 11,000 p.s.i. by changing only the "normal consistency"; the more water used in mixing, the weaker the set mass. Density, hardness, strength, resistance to abrasion, and water absorption are all intimately related to the quantity of water used in the mix.

Exceptionally good results have been obtained when the cement for the I-beams 12 was made from a gypsum slurry produced from "Industrial White Hydrocal," a product of the United States Gypsum Company having a "normal consistency" between 38 to 42. This gypsum is not only a neutral gypsum, but also sets to a high strength dihydrate. "Hydro-Stone," another high strength gypsum of The United States Gypsum Company and which is stronger than the "Industrial White Hydrocal," has been used top roduce very strong panels when made in a slurry having a "normal consistency" prepared by mixing 100 parts by weight of "Hydro-Stone" with 34 parts by weight of water. However, the "Hydro-Stone" gypsum has a rather high pH value, and this alkalinity makes the use of "Hydro-Stone" cement under moist conditions undesirable for stiffening glass fibers because of possible fiber degradation.

Still another cement which exhibits excellent wet strength is a water resistant, modified plaster that has been treated with alum during calcination. The slurry for this cement has a "normal consistency" that is produced by adding 40 to 52 parts by weight of water to 100 parts by weight of cement, and this cement is especially useful where the panels are to be used in bath and shower room installations.

A second class of inorganic cements which are satisfactory for the I-beams 12 are the oxycements and particularly magnesium oxysulphate, magnesium oxychloride and magnesium oxyphosphate. These cements are heat settable and not only set much faster than gypsum, which is not heat reactive, but also lend themselves to high speed curing processes. For example, thin films of magnesium oxysulphate cement can be cured in one minute at a temperature as low as 170° F. Aluminite and magnesium oxychloride cements are likewise neutral and are satisfactory for the cement in the I-beams 12.

Very good results have been obtained by using a cement slurry composed of 100 parts by weight of calcined magnesium oxide, 200 parts by weight of a 30 weight percent solution of $MgSO_4 \cdot 7H_2O$, 200 parts by weight of potters flint, and 300 parts by weight of 80 mesh sand. This composition produced an extremely hard cement which showed no tendency to crack or craze upon drying, and in order to obtain a maximum wet strength the ratio of the calcined magnesium oxide to $MgSO_4 \cdot 7H_2O$ was held to a 10:1 molar ratio (1.66:1 on a weight basis).

For fireproof panels having a heat resistant rockwool or glass fiber core, a hydraulic cement is used which, upon firing, converts to a ceramic cement. Sillimanite and aluminite cements are examples of such a material. In addition, the cements described in U.S. Patents 2,479,504; 2,680,890 and the references cited in these patents can be used; as well as the improvement on these materials wherein a colloidal silica is added.

The same materials used in the I-beams 12 are likewise used in the top supporting skin 13 and the bottom sup- ---
[1] The term "neutral gypsum" is used herein in its recognized sense to refer to gypsum which is not highly alkaline, i.e. has a pH from about 7 to about 10. Where siliceous fibers other than glass are to be stiffened, the bonding material need not be neutral and in some instances can be alkaline gypsum and stuccos.

porting skin 13 and the bottom supporting skin 14. While it is preferable that the skins 13 and 14 be kept as thin as possible with the cement being forced into the surfaces of the core to form a high strength region of combined cement and glass fibers, the resins and cements may be foamed for installations where lower thermal conductivity is desired and over-all panel thickness is not critical. While foaming increases the thickness of the skins 13 and 14, the over-all weight of the panel 10 is not increased.

The skins 13 and 14 are given additional reinforcement by equally spaced glass rovings 15 embedded therein. The rovings 15 prevent cracking and crazing of the skins which can occur because of shrinkage of the cement during drying. These rovings are preferably 150 strand, 20-end and are laid parallel in the direction of the I-beams 12 to insure maximum utilization of fiber strength. Very good results have been obtained when 15 to 20 grams of the rovings 15 per square foot of panel surface are used, with 15 grams being preferable. However, the quantity of rovings used may vary between 5 to 30 grams per square foot, depending upon the amount of reinforcement required. In the fireproof panels, rovings 15 comprises high temperature glass fibers or glass fibers that have been leached and treated with a solution of a chromium salt such as chromium sulfate followed by a dip in $NH_4OH$. Upon firing the chromium hydroxide formed was converted to $Cr_2O_3$.

A typical panel 10 of the type shown in FIG. 1 constructed in accordance with the invention has a plurality of core strips 11 that are ⅞ inch thick and 2 inches wide. In the typical panel 10 these strips 11 contact each other and are bonded together with an inorganic cement, such as the neutral gypsum or magnesium oxysulphate, to form I-beams 12 on ⅞ inch centers. The resulting glass-cement composite core has an apparent density of 16 to 18 pounds per cubic foot, and the core composition is 57 percent by weight of glass wool and 43 percent by weight of cement. This typical panel 10 has 1/16 inch thick supporting skins 13 and 14 composed of 15 grams of rovings 15 and 200 to 250 grams of cement per square foot of skin. The 2 inch core plus the 1/16 inch skins form a panel 10 having a thickness of 2⅛ inches and an apparent density of 22 to 24 pounds per cubic foot.

Roof structures are designed for long life, and the physical properties of the panels must be such that they can be safely used throughout this life. Flexural strength and flexural modulus are physical properties which indicate the reliability of a structural member, and these properties of sample panels constructed according to the invention, using both gypsum and megnesium oxysulphate cements, are given below in Table I.

TABLE I

| | Cement Material | | | |
| --- | --- | --- | --- | --- |
| | Magnesium Oxysulphate | | Gypsum | |
| Sample Number | 1 | 2 | 3 | 4 |
| Panel Thickness (In.) | 2.125 | 2.1875 | 2.125 | 2.15 |
| Apparent Density (lbs./ft.³) | 20.2 | 20.0 | 22.7 | 24.4 |
| Flexural Strength (p.s.i.): | | | | |
| Maximum | 217 | 620 | 1,129 | 1,161 |
| Proportional Elastic Limit | 395 | 400 | 402 | 367 |
| Flexural Modulus (×10³ p.s.i.) | 171 | 170 | 516 | 632 |

The panel of sample number 2 has a layer of polyisobutylene on the surface exposed to the weather. The flexural strengths of the panels in the various samples above vary according to the following factors: the over-all apparent density; the core construction, density and composition; and the thickness, composition and amount of reinforcement used in the skins. Some panels in the 24 to 25 pounds per cubic foot apparent density range have been made which had a flexural modulus as high as $730 \times 10^3$ p.s.i.

The flexural strengths and flexural moduli shown in Table I are for the samples without any previous conditioning. Inasmuch as flexural strength is reduced in a moist environment, a freeze-thaw test was used to condition the panels by submitting them to three freeze-thaw cycles, each of which consisted of 24 hours in a humidity cabinet followed by 24 hours in a freezer, and then testing them for flexural strength and modulus. The results of these tests appear below in Table II.

TABLE II

| Sample Number | 1 | 2 | 3 |
| --- | --- | --- | --- |
| Flexural Strength (p.s.i.): | | | |
| Maximum | 829 | 830 | 997 |
| Proportional Elastic Limit | 220 | 220 | 295 |
| Flexural Modulus (×10³ p.s.i.) | 190 | 190 | 333 |

Sample number 4 was given a more extensive two week conditioning in a weathering room. At the end of this period the maximum flexural strength was reduced by 11 percent while the flexural modulus was reduced 13 percent. None of the skins of the samples exhibited any tendency to separate from the core strips because of freezing or moisture condensation within the panels.

An increase rather than a decrease in flexural modulus occurred after three freeze-thaw cycles in Samples 1 and 2. Both of these samples used magnesium oxysulphate, which is highly resistant to water when the molar ratio is 10:1 or higher as stated earlier, illustrating that such panels tend to maintain their stiffness under extremely adverse wet conditions. While each of the magnesium oxysulphate panels exhibited a flexural modulus which was lower than any of the gypsum panels, the lower densities of the magnesium oxysulphate panels by comparison with those of the gypsum panels may account for this difference in values.

Compressive strengths of additional panels, identified as Samples 5 and 6, are listed below in Table III. Here again the panels were tested dry and in a conditioned state after they had been subjected to three cycles, each of which included 24 hours in a humidity cabinet followed by 24 hours in a freezer.

TABLE III

| | Sample Number | |
| --- | --- | --- |
| | 5 | 6 |
| Bonding Material | Gypsum | Magnesium Oxysulphate |
| Density (lbs./ft.³) | 22.3 | 21.6 |
| Compressive strengths: | | |
| Dry: | | |
| Maximum Load (p.s.i.) | 152.0 | 159.0 |
| Deflection (percent) | 3.6 | 3.1 |
| Proportional Elastic Limit: | | |
| Load (p.s.i.) | 113.0 | 136.0 |
| Deflection (percent) | 2.6 | 2.6 |
| Conditioned: | | |
| Maximum Load (p.s.i.) | 124.0 | 142.0 |
| Deflection (percent) | 2.7 | 2.8 |
| Proportional Elastic Limit: | | |
| Load (p.s.i.) | 115.0 | 124.0 |
| Deflection (percent) | 2.4 | 2.4 |

An important measure of reliability of structural panels is their impact strength, which may be ascertained by dropping a 10-pound weighted bag onto a seven-inch wide panel that is 32 inches long and is mounted on spaced supports one inch wide to provide a 30-inch span. The bag is repeatedly dropped from heights increasing in six-inch increments until the panel breaks of the deflection is sufficient to cause the panel to fall from the spaced supports. The panel of Sample No. 4 broke when the bag was dropped from a height of 84 inches, while another panel having an identical density of 24.4 pounds per cubic foot and a thickness of 2.1875 inches, including a layer of polyisobutylene on one surface, broke when the bag was dropped from a height of 108 inches.

These panels also had very low thermal conductivity. A 32-inch by 48-inch panel having I-beams formed of gypsum cement and a layer of polyisobutylene adhered to one face had an over-all thickness of 2.185 inches and a density of 23 pounds per cubic foot. The conductance value ($c$) of this panel was found to be 0.293 B.t.u. per hour per foot$^2$ per degree F., and the transmittance value ($u$) was determined to be 0.211 B.t.u. per hour per foot$^2$ per degree F.

Referring now to FIG. 2, there is shown a panel 16 having improved acoustical properties. More particularly, the panel 16 comprises a plurality of lightweight core strips 17 which contact one another and are bonded together at adjoining surfaces by layers of cement which form I-beams 18. As in the case of the panel shown in FIG. 1, the panel 16 has a top skin 19 and a bottom skin 20. The skins 19 and 20 are reinforced by spaced, parallel rovings 21.

The rovings 21 of the panel 16 are bunched directly over the I-beams 18, leaving a space ½ inch to ⅝ inch wide, and free of rovings, between the ribs. Holes 22 are drilled in these roving free spaces, preferably on one inch centers.

A comparison between a structural I-beam panel of the type shown in FIG. 1 and the acoustical panel shown in FIG. 2 are listed below in Table IV.

TABLE IV

|  | Structural Panel | Acoustical Panel |
| --- | --- | --- |
| Density (lbs./ft.$^3$) | 22.3 | 20.0 |
| Flexural strength (p.s.i.): |  |  |
| Dry: |  |  |
| Maximum | 1,129 | 1,139 |
| Proportional Elastic Limit | 403 | 368 |
| Conditioned: |  |  |
| Maximum | 997 | 1,049 |
| Proportional Elastic Limit | 295 | 218 |
| Flexural Modulus (×10$^3$ p.s.i.): |  |  |
| Dry | 516 | 474 |
| Conditioned | 333 | 281 |

Referring to FIG. 3, there is shown a panel 23 of the column type. The panel 23 comprises a core 24 of preformed glass fibers in the form of a board in which the fibers extend generally lengthwise of the board parallel to its side surfaces and which has a plurality of columns 25 therein. The core 24 may also be commercial acoustical base board. The opposite surfaces of the core 24 are covered with a top supporting skin 26 and a bottom supporting skin 27 reinforced by a plurality of equally spaced, parallel rovings 28. The columns 25 are preferably between 0.17 and 0.22 inch in diameter and spaced on one inch centers.

Other materials, such as chopped fibers or mat, may be used as a reinforcing medium for the skins 27 and 28. More particularly, five basic types of glass reinforcing media have been used with satisfactory results. These are 10 mil bonded mat, one ply of base mat, one ply of ½ ounce mechanical mat, two inch lengths of 150's cut strands, and 20-end parallel roving. In the case of the light density "Kaylo" panels faced with gypsum, the addition of 0.5 percent by weight of ½ inch long glass strands doubled the modulus of the panel with only a slight over-all apparent density change from 21 p.c.f. to 23 p.c.f.

A number of column type panels of the FIG. 3 type, made with "Industrial White Hydrocal" gypsum in both the columns and the skins, have been produced. The core of each panel was acoustical base board, and the columns of each panel were on one inch centers. Various properties of these panels are listed below in Table V.

TABLE V

| Sample Number | 1 | 2 | 3 | 4 | 5 |
| --- | --- | --- | --- | --- | --- |
| Density (p.c.f.) | 16.2 | 15.5 | 16.0 | 16.0 | 16.0 |
| Composition: |  |  |  |  |  |
| Cement (percent by weight) | 30.8 | 35.0 | 36.1 | 36.1 | 36.1 |
| Glass (percent by weight) | 69.2 | 65.0 | 63.9 | 63.9 | 63.9 |
| Skin Reinforcement | (1) | (2) | (3) | (4) | (3) |

[1] Roving.
[2] Base Mat.
[3] Bonded Mat.
[4] Cut Strands.

The panels 23 are produced by drilling holes on one inch centers in a preformed glass fiberboard and filling the holes with a cement slurry or foamable resin by troweling over the top surface of the board. The cement or foamable resin can be of the type previously described that is used in the panels 10 and 16 of FIGS. 1 and 2.

After the holes are filled with the cement slurry, additional slurry is forced into the top surface by further troweling. The reinforcing glass rovings 28 are then placed in position and a second layer of cement slurry is applied. After the top supporting skin 27 has taken a green set, the panel 23 is turned over and the bottom skin 27 is applied in an identical manner.

Figure 7:
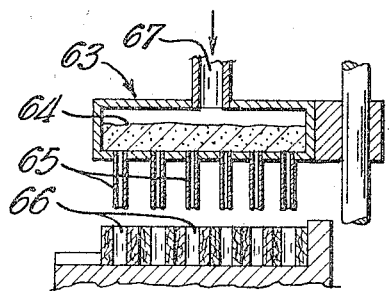
FIG. 7 is a fragmentary cross-sectional view taken approximately on the line 7—7 of FIG. 5.

The method and apparatus for producing the panel 10 of FIG. 7, which is a preferred embodiment of the invention, is illustrated in FIG. 4. More particularly, a porous mass of core material such as a preformed glass fiberboard 29, preferably having an apparent density of 9 to 12 p.c.f., is cured in an oven 30 in a conventional manner. As the board 29 leaves the oven 30 it may be supported by a conveyor and is sanded by any suitable device indicated at 31 to insure uniform thickness and parallel surfaces.

When the panels are to be used in fireproof installations, the porous mass of core material may be boards made from reacted calcium silicates, such as "Kaylo," and these boards are fed to the sanding device 31. After sanding of the top surface thereof, the "Kaylo" boards are knife coated with the previously described colloidal suspension of starch, carboxyl methyl cellulose, or bone glue if gypsum cement is to be used in the panel, and this layer need not be dry before the gypsum is applied.

Cement which is used for I-beams as previously described and indicated at 32 is applied by an applicator 33 to a uniform thickness. The applicator 33 is shown in FIG. 4 in the form of a doctor blade that is suitable for coating the top surface of the board 29. However, spray nozzles (not shown) may be used to apply the foamable organic resins. Also, roller coaters may be used to apply both the organic resins and the inorganic cements.

A suitable chopping device 34 is utilized to cut the preformed board, with the cement applied to its upper surface, to predetermined lengths, and to form individual coated boards indicated at 35. The individual boards 35 are assembled in a stack 36 to arrange the boards in juxtaposition with a coated surface of one board in contact with the uncoated surface of the adjacent board, and while the stack may contain any number of boards, a stack of twelve boards one inch thick is convenient to handle. A heavy weight 37 is applied to the coated surface of the topmost board of the stack to apply a pressure thereto for forcing the cement into the surfaces of the boards and to maintain the boards in contact with one another.

After a green set is achieved in the cement between the individual boards, each stack is longitudinally cut at right angles to the layers of the cement by a conventional cutting device 38, such as a vertical band saw, to form the cement coated core sections illustrated in FIG. 1.

Here again, if the core material is "Kaylo," the surfaces of the core sections are knife coated with the starch solution, carboxy methyl cellulose or bone glue solution if gypsum is to be applied.

As these core sections are removed from the stack after being sawed, they are sequentially aligned to form a slab 39, and, as the slabs 39 are moved in a longitudinal direction, cement of the type previously described and indicated at 40 is applied to the top surface thereof by an applicator 41, which may be a doctor blade, spray nozzle or roller coater, to form the top supporting skins 13 of FIG. 1. If the panels are to be subjected to excessive stresses which might tend to separate the skins from the core strips, the slab 39 may be perforated on both its top and bottom surface, and the slab 39 is perforated before the cement 40 is applied. Each perforation is preferably ½ inch to ¾ inch deep, and approximately ⁵⁄₁₆ inch in diameter. The perforations are located midway between the I-beams and are placed on 1½ inch centers.

A backing 42, e.g. of polyisobutylene, is applied from a roll 43 to the underside of the slab 39. Cement or resin of the type previously described and indicated at 44 is applied to the upper surface of the backing 42 by an applicator 45, which may be a doctor blade, spray nozzle or roller coater to form the bottom supporting skin 14 of FIG. 1.

After the cement 40 has been placed on the top surface of the slab 39 and as the cement 44 is deposited on the backing 42, spaced rovings are embedded in each of these layers of cement as illustrated by the parallel rovings 15 in FIG. 1. More particularly, as shown in FIG. 4, parallel rovings 46 having equal spacings therebetween are supplied from spools 47 and are fed into the cement 44. The rovings 46 are embedded in the cement 44 by both the applicator 45 and a roller 48 which forces a portion of the cement into the bottom surface of the slab 39. Likewise, spaced rovings 49 are fed from spools 50 into the cement 40 and a roller 51 embeds these rovings in the cement while forcing a portion of the cement into the upper surface of the slab 39.

The coated slab 39 is continuously fed into an oven 52 which foams the resin, if a foamable resin is used, or cures the cement if magnesium oxysulphate is used. The oven 52 may be eliminated if gypsum is used as the bonding material.

The finished board 53 leaves from the exit side of the oven 52 as shown in FIG. 4, and is cut into appropriate panels 54 by a suitable cutting device 55. The panels 54 are stacked at 56.

If acoustical panels of the embodiment shown in FIG. 2 are to be produced, the parallel rovings 46 and 49 are not equally spaced, but are grouped over the layers of cement in the slabs. Likewise, after the finished board leaves the oven 52 to be sawed into panels, these panels are subsequently drilled.

FIG. 5 of the drawings shows a preferred method by which the structure of FIG. 3 can be produced. The apparatus shown in FIG. 5 is generally similar to that shown in FIG. 4 and those portions which correspond to similar portions of FIG. 4 are designated by a like reference numeral characterized further in that a prime mark is affixed thereto.

After the board formed by phenol-formaldehyde bonded glass fibers passes from the oven 30' and is sanded by the roller 31', it is conveyed to a gang drill 60 having a plurality of drills 61 spaced approximately one inch apart, and the drills are carried by a head 62 for movement down through the glass fiberboards. The drills 61 form holes of the desired size shown in FIG. 3 following which the head 62 is raised and the drilled glass fiberboard is advanced to beneath an impregnating head 63. The impregnating head 63 has a cavity 64 therein which is filled with the cement slurry that is to be used to form the columns 25. A plurality of small tubes are mounted on the bottom of the head 63 at the same spacing as are the drills 61 so that movement of the head 63 toward the drilled glass fiberboard causes the tubes 65 to penetrate the openings 66 made by the drills 61. The tubes 65 have a close fit with the sidewalls of the openings 66 and the longitudinal openings through the tubes 65 communicate with the cavity 64 of the impregnating head 63. An air pressure supply line 67 is provided on the top of the impregnating head to communicate air pressure to the chamber 64 during the time that the tubes 65 are in the holes 66.

Figure 6:
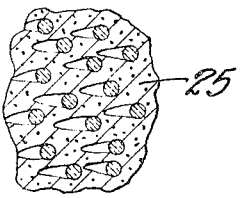
FIG. 6 is a fragmentary view which depicts the honeycomb structure of the binder fiber material formed by the present invention.

The holes 66 can be filled by lowering the ends of the tubes 65 a slight distance below the top surface of the glass fiberboard following which air pressure is admitted to the chamber 64 to fill the opening 66 and force the slurry laterally past the fibers to produce the honeycomb structure shown in FIG. 6.

A preferred method of producing the columns 25, however, is achieved by lowering the tubes 65 to adjacent the bottom ends of the openings 66 and thereafter admitting the air pressure to the chamber 64 to fill the bottom of the openings 66 and force the slurry sideways past the fibers adjacent the bottom end of the openings. While air pressure is held on the chamber 64, it is raised vertically to withdraw the tubes 65 upwardly of the openings. The pressure on the slurry thus produces lateral flow past a small area of fibers at any instant to insure lateral flow past the fibers at all levels of the openings. This progressive action gives a better and more uniform honeycomb structure, therefore, throughout the depth of the board. The air pressure is removed at the time that the tubes 65 reach the top surface of the board and the boards.

After the holes are filled, the boards are placed on a conveyor and their top and bottom surfaces coated with layers of the cement, as at 40' and 44'. The rovings 49' and 46' are applied to the top and bottom surfaces of the board following which the board passes through an oven 52' which provides a controlled temperature for the cure of the cement.

In some instances, the slurry which is placed in the opening 66 by the impregnating head 63 can be a foamable one, such as the foamable oxysulphate cements that are well-known in the art. Where foamable cements are used it will only be necessary to fill the opening 66 by reason of air pressure applied through the air supply conduit 67 without producing an substantial lateral flow past the fibers. The foamable cement can be caused to foam in the oven 52' by reason of autogenously produced pressure which then causes the cement to flow laterally past the fibers to produce the honeycomb structure shown in FIG. 6. In this instance, the binder is a foam.

The structure fo FIG. 3 can also be made using a foamable organic binder such as a foamable phenol-formaldehyde resin. One suitable foamable resin has the following composition:

| | Parts by wt. |
|---|---|
| Novolac A later to be described | 77 |
| Hexamethylene tetramine | 16 |
| Dinitrosopentamethylene tetramine | 4 |
| Silicone wetting agent | 4 | an example of which is:

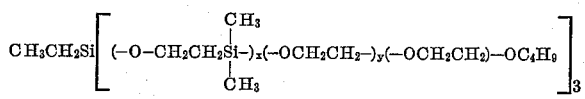

wherein the total of the three X's is approximately 20, and 63 parts by weight of denatured ethyl alcohol. The openings 66 can be filled with this material by the impregnating head 63, following which it will be foamed by the oven 52' which should preferably be held at a temperature of 350° F. Prior to entering the oven 52' it should be coated on its top and bottom surfaces with the same foamable resin given above, so that the top and bottom skins and the columns 25 are formed of the same material.

Novolac A was produced in a jacketed, 10 gallon glass-lined kettle fitted with an anchor-type agitator, a thermometer and a reflux condenser from a charge of 20.29 kilograms of U.S.P. phenol, 12.95 kilograms of 37 percent formalin (a 37 percent solution of formaldehyde in water)

and 0.1 kilogram of oxalic acid. The phenol and the formaldehyde were mixed at about 40° C. in the reaction kettle, and the oxalic acid, in a granular condition, was added. The agitator was driven to accomplish this mixing, and was continued until reaction between the phenol and the formaldehyde was substantially complete, and a novolac had been formed. Water at a temperature of about 50° F. was also circulated through the jacket of the reflux condenser from the beginning of the mixing operation until substantial completion of the reaction between the phenol and formaldehyde and production of the novolac. The kettle was then heated by circulating low pressure steam through the jacket to bring the reaction mixture to a temperature ranging from 94° C. to 96° C., and water or steam was then used, as required, to maintain the reaction mixture at a temperature within such range for a period of 6½ hours. Agitation of the reaction products in the kettle was then stopped, and the reaction products were allowed to stand for about 1 hour. During this time a phase separation occurred, an aqueous layer rising to the top, and an organic layer collecting in the bottom of the kettle. The aqueous top layer was then siphoned from the kettle; agitation was resumed; and steam was introduced into the jacket of the kettle to bring the reaction products to a temperature of approximately 120° C. in a period of about 2½ hours. The reaction products were maintained at about 120° C. by suitable adjustment of the flow of steam to the kettle jacket, while gases and vapors were exhausted from the upper portion of the kettle to decrease the pressure therein gradually, over a period of about 15 minutes, until a vacuum of 28" of mercury was reached, and for an additional hour while a vacuum of about 28" of mercury was maintained.

Various equivalents of the elements above described will occur to those skilled in the art to which the invention relates. It will be apparent that the skins 13 and 14, 19 and 20, 26 and 27, and those formed in FIGS. 4 and 5 need not be made of a binder material but can be made of any reinforcing such as paper, plywood, plastic, gypsum board masonite, transite, etc. so long as the vertical high strength regions bond thereto.

What I claim is:

1. A lightweight high strength longitudinally extending panel comprising: a core of siliceous fibers having closely spaced major surfaces and longitudinally extending generally parallel side surfaces with the individual fibers extending generally parallel to said side surfaces, said fibers being bonded together at spaced apart points by a first binder, first and second skins on respective major surfaces, and a plurality of rigid shear resistant high strength regions of binder and fibers extending between and bonded to said first and second skins, the binder of said high strength regions also having sufficient lateral penetration of the mass of fibers to achieve a significant lateral bracing of the fibers by interconnecting binder which braces the fibers laterally to each other intermediate points bonded together by said first mentioned binder.

2. The lightweight high strength board material of claim 1 wherein the high strength regions run in strips extending longitudinally of the board.

3. The lightweight high strength board material of claim 1 wherein the high strength regions are spaced-apart columns which connect said first and second skins.

4. A lightweight high strength longitudinally extending panel comprising: a core of glass fibers having closely spaced major surfaces and longitudinally extending generally parallel side surfaces with the individual fibers extending generally parallel to said side surfaces, said fibers being bonded together at spaced apart points by a first binder, first and second layers of a binder material on respective major surfaces, a plurality of rigid shear resistant high strength regions of binder and fibers extending between and bonded to said first and second layers, the binder of said high strength regions also having sufficient lateral penetration of the mass of fibers to achieve a significant lateral bracing of the fibers by interconnecting binder which braces the fibers laterally to each other intermediate points bonded together by said first mentioned binder, and glass reinforcing bonded to said first and second layers over said high strength regions with fibers of said glass reinforcing running longitudinally of said board structure.

5. The lightweight high strength board material of claim 4 wherein the high strength regions are spaced-apart columns which connect said first and second skins.

6. The lightweight high strength board material of claim 1 wherein said high strength regions are formed from a binder which has been forced laterally past the fibers by autogenous pressure to produce said porous structure.

7. The lightweight high strength board material of claim 1 wherein said binder is an oxycement.

8. The lightweight high strength board material of claim 1 wherein said binder is gypsum.

References Cited

UNITED STATES PATENTS

| | | | |
|---|---|---|---|
| 2,546,230 | 3/1951 | Modigliani | 156—200 X |
| 2,668,348 | 2/1954 | Hubbell | 156—291 X |
| 2,712,174 | 7/1955 | Hubbell | 156—291 X |
| 3,155,560 | 11/1964 | Onstad et al. | 156—295 X |

ALEXANDER WYMAN, *Primary Examiner.*

M. A. LITMAN, *Examiner.*